US007853631B2

(12) United States Patent
Ajiro

(10) Patent No.: US 7,853,631 B2
(45) Date of Patent: Dec. 14, 2010

(54) BILLING SYSTEM AND METHOD FOR CHARGING USERS FOR UTILIZATION OF SHARED RESOURCE

(75) Inventor: Yasuhiro Ajiro, Tokyo (JP)

(73) Assignee: NEC Corporation, Tokyo (JP)

( * ) Notice: Subject to any disclaimer, the term of this patent is extended or adjusted under 35 U.S.C. 154(b) by 1029 days.

(21) Appl. No.: 11/612,815

(22) Filed: Dec. 19, 2006

(65) Prior Publication Data

US 2007/0143220 A1 Jun. 21, 2007

(30) Foreign Application Priority Data

Dec. 20, 2005 (JP) ............................ 2005-366467

(51) Int. Cl.
*G06F 17/00* (2006.01)

(52) U.S. Cl. ..................................................... 708/110

(58) Field of Classification Search ....................... None
See application file for complete search history.

(56) References Cited

U.S. PATENT DOCUMENTS

| | | | | |
|---|---|---|---|---|
| 5,943,320 | A * | 8/1999 | Weik et al. | 370/259 |
| 2005/0138168 | A1* | 6/2005 | Hoffman et al. | 709/224 |
| 2005/0138422 | A1* | 6/2005 | Hancock et al. | 713/201 |
| 2008/0005156 | A1* | 1/2008 | Edwards et al. | 707/102 |
| 2008/0049745 | A1* | 2/2008 | Edwards et al. | 370/389 |
| 2008/0052206 | A1* | 2/2008 | Edwards et al. | 705/34 |
| 2008/0052387 | A1* | 2/2008 | Heinz et al. | 709/223 |

FOREIGN PATENT DOCUMENTS

| | | | |
|---|---|---|---|
| EP | 0 526 118 | A3 | 2/1993 |
| EP | 1 229 712 | A3 | 10/2002 |
| GB | 2 339 116 | A | 1/2000 |
| JP | 3322241 | B2 | 6/2002 |
| JP | 2002-368782 | A | 12/2002 |
| JP | 2004-200891 | A | 7/2004 |

* cited by examiner

*Primary Examiner*—David H Malzahn
(74) *Attorney, Agent, or Firm*—Sughrue Mion, PLLC

(57) ABSTRACT

Disclosed is a billing system that charges resource users for the utilization of a shared resource. The billing system acquires data representing a resource utilization rate at intervals, calculates a utilization rate difference between the acquired resource utilization rate and a reference (average) resource utilization rate, and substitutes the utilization rate difference for the argument of a predetermined math function, such as linear function, to produce a collective adjustment payment (surcharge or discount). Individual adjustment payments are obtained from the collective adjustment payment respectively for resource users.

39 Claims, 5 Drawing Sheets

BILLING SYSTEM AND METHOD FOR CHARGING USERS FOR UTILIZATION OF SHARED RESOURCE

BACKGROUND OF THE INVENTION

1. Field of the Invention

The present invention relates to a billing system and method for charging users for the utilization of a finite amount of a shared resource. The present invention is particularly suitable for charging computer resource users.

2. Description of the Related Art

Japanese Patent No. 3,322,241 discloses a billing system for a mobile communication network for charging users according to average utilization rates of wireless base stations. A billing rank is determined for each base station in advance, based on its average utilization rate. Users are charged according to both the billing rank and the amount of traffic of their base station. For each base station, a ranking-based billing scheme is established so that users are charged with a low discount rate when the utilization rate of the base station is high. Likewise, a traffic-based billing scheme is established so that the discount rate is low when the congestion level of the traffic is high.

A billing system for a mobile communication network is also disclosed in Japanese Patent Publication 2002-368782. According to this billing system, different discount rates are offered during high congestion periods depending on applications (such as FTP, TELNET and HTTP) and congestion levels of traffic. Each base station classifies received packets into groups according to users and application protocols and counts the received packets according to the groups. A base station controller transmits a measurement packet to the base station once a certain number of packets the base station receives. In response to the measurement packet, the base station determines the time interval between two measurement packets and calculates the congestion level of traffic from the determined time interval. If the calculated congestion level exceeds a predetermined threshold, the base station recognizes that a delay has occurred in packet transmission. Billing data is transmitted from the base station to a server either once when the user terminates communication or periodically during communication.

According to a billing system disclosed in Japanese Patent Publication 2004-200891 for a fixed communications network, users are charged an extra fee if their communication routes are using a switching equipment of which the utilization rate exceeds an upper limit.

However, a first problem that is common to the prior art techniques is the difficulty for administrators or owners of resources in estimating the total income (i.e., charge) obtained from the users of the resources (such as base stations, applications and communication links). This problem arises from the nonexistence of criteria to determine discount rates.

A second problem is that the prior art techniques need a large storage space for billing because of the necessity to maintain as a table for example, the ranks of base stations, discount rates for congestion, or surcharges for overloaded switching equipments.

SUMMARY OF THE INVENTION

It is therefore an object of the present invention to provide a billing system and method that enables network administrators to maintain a definite amount of income from utilization of shared resource by users.

A further object of the present invention is to provide a billing system and method capable of calculating surcharges and discounts for short-term resource utilization rates, whereby users are refrained from using the resource when the surcharges are relatively high so that violent fluctuations of load on the shared resource are prevented.

A still further object of the present invention is to provide a billing system and method that reduce the amount of storage space for billing purposes by eliminating the need to maintain detailed information as to surcharges and discounts prescribed for resource utilization rates.

According to a first aspect of the present invention, there is provided a billing system that comprises a data acquisition section that acquires data representing a resource utilization rate, a first calculation section that calculates a utilization rate difference between the acquired resource utilization rate and a reference resource utilization rate, and a second calculation section that substitutes said utilization rate difference for the argument of a predetermined math function to produce an adjustment payment.

According to a second aspect of the present invention, there is provide a billing system that comprises a resource utilization rate data acquisition section that acquires a record of data representing resource utilization rates obtained over a period of time, a first calculation section that calculates an average value of resource utilization rates of said acquired record to produce a reference resource utilization rate, a second calculation section that calculates a utilization rate difference between each of said acquired resource utilization rates and said reference resource utilization rate, and a third calculation section that substitutes said utilization rate difference for the argument of a predetermined math function to produce an adjustment payment.

According to a third aspect of the present invention, there is provided a method of billing comprising the steps of acquiring data representing a resource utilization rate, calculating a utilization rate difference between the acquired resource utilization rate and a reference resource utilization rate, and substituting said utilization rate difference for the argument of a predetermined math function to produce an adjustment payment.

According to a fourth aspect, the present invention provides a method of billing comprising the steps of acquiring a record of data representing a plurality of resource utilization rates obtained at predetermined intervals over time, calculating an average value of said acquired resource utilization rates to produce a reference resource utilization rate, calculating utilization rate differences between said acquired resource utilization rates and said reference resource utilization rate, and substituting each of said utilization rate differences for the argument of a predetermined math function to produce an adjustment payment.

BRIEF DESCRIPTION OF THE DRAWINGS

The present invention will be described in detail with reference to the following drawings, in which.

DETAILED DESCRIPTION

Figure 1:
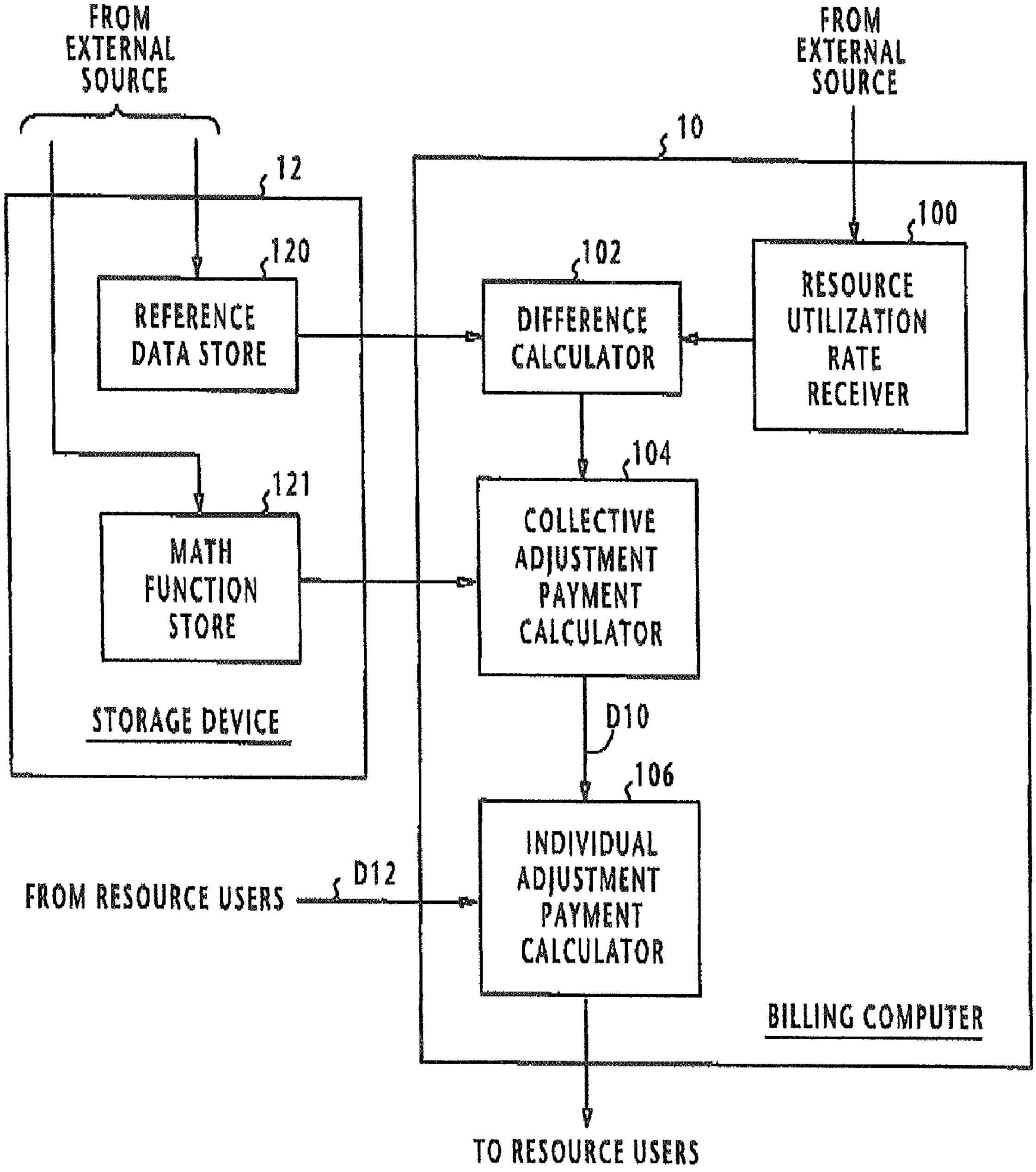
FIG. 1 is a block diagram of a billing system according to the present invention.

Referring now to FIG. 1, there is shown a billing system according to a first embodiment of the present invention. The billing system comprises a billing computer 10 and a storage device 12. Billing computer 10 has a number of functional sections including a resource utilization rate receiver (or data acquisition section) 100, a utilization rate difference calculator 102, a collective adjustment payment calculator 104 and an individual adjustment payment calculator 106. Storage device 12 includes a reference data store 120 and a math function store 122.

In this specification, the term "resource" is used to refer to any of consumable artificial or natural finite resources such as the CPU of a computer or a server, a magnetic disk or an optical disk for data storage, communications network elements such as transmission bandwidths, and water supply and electric power supply systems. If the resource is a CPU, the resource utilization rate is the rate of time during which the CPU is actually used in a unit time, often referred to as CPU utilization. In the case of water and power supply systems, the resource utilization rate is the amount consumed in a unit time (e.g., per hour).

The data maintained in the reference data store 120 represents a basic quantity of resource utilization rate supplied from an external source, and the data maintained in the math function store 122 represents a mathematical function which is also supplied from the external source. The math function is used by the collective adjustment payment calculator 104 to calculate a collective adjustment payment. The basic resource utilization rate maintained in the store 120 indicates a reference value of resource utilization rate, which is used to calculate an amount of adjustment payment that varies with time. If the resource is a CPU, the reference resource utilization rate represents an average value of, for example, three-month CPU utilization rates. If the resource is electric power, the reference resource utilization rate is, for example, an annual mean value of per-hour electric power utilization rate.

From an external source, the resource utilization rate receiver 100 acquires data representing a current resource utilization rate measured per unit time interval and feeds it to the utilization rate difference calculator 102. Utilization rate difference calculator 102 subtracts the reference resource utilization rate from the current resource utilization rate supplied from the resource utilization rate receiver 100 to determine a utilization rate difference. If the reference resource utilization rate is smaller than the current resource utilization rate, the utilization rate difference is positive and a surcharge is imposed; if the reference value is greater than the current resource utilization rate, the utilization rate difference is negative and a discount is made. The value of the utilization rate difference is supplied to the collective adjustment payment calculator 104.

Collective adjustment payment calculator 104 calls the math function from the math function store 122 and substitutes the output of utilization rate difference calculator 102 for the argument of the fetched math function to yield an output 110 that represents a collective adjustment payment (surcharge or discount) for a given unit time interval. The math function fetched from the store 122 is one that satisfies the linearity principle $f(a)+f(b)=f(a+b)$. The simplest form of linear functions is $f(x)=k*x$, where k is a constant.

Assume that the reference resource utilization rate is 0.20 (i.e., 20%), the math function $f(x)=10000*x$, and the current resource utilization rate during a unit time interval is 0.35. Since the difference utilization rate is equal to 0.35-0.20=0.15, the value 0.15 is substituted for the argument "x" of the function f(x), yielding an output $f(0.15)=10000\times 0.15=1500$ (Yen). Note that, regardless of the positive and negative signs of the output of utilization rate difference calculator 102, the math function f(x) should be determined so that a surcharge is imposed when the basis resource utilization rate is smaller than the current resource utilization rate and a discount is made when the reference resource utilization rate is greater than the current resource utilization rate.

Since the calculation of surcharge and discount for a consumed resource only requires data representing a basis resource utilization rate and a math function, not requiring an adjustment payment table, the memory capacity of stores 120 and 122 can be kept small.

Individual adjustment payment calculator 106 receives data D10 representing the collective adjustment payment from the calculator 104 and also receives data D12 representing users resource utilization data from an external source. In one example, the users data D12 represents the total number of users who used the common resource during a given unit time interval. In this case, the individual adjustment payment calculator 106 arithmetically divides D10 by D12 to produce, at unit intervals, an individual adjustment payment (surcharge or discount) that is equally allocated to all the resource users.

In another example, the resource user data D12 represents the rates of resource consumed by individual users to the total resource utilization rate. In his case, the individual adjustment payment calculator 106 arithmetically multiplies D10 by D12 to produce a plurality of individual surcharges or discounts of the respective users per unit time interval.

Note that the individual adjustment payment calculator 106 is not necessarily provided in the billing computer 10; it may be provided in some convenient location away from the billing computer 10.

Although not shown in FIG. 1, a printer and a display unit may be connected to the outputs of the calculators 104 and 106 to print and display their output data.

In a practical application, the first embodiment of the present invention is implemented in the server management division of a private company. The operating cost of the server is shared by a number of other divisions (or user divisions) in terms of their CPU utilization rate. The management division measures (or samples) the CPU utilization rate of each user division at 5-minute intervals, for example, and supplies the measured data either in sequence on a real-time basis to the resource utilization rate receiver 100, or stores it in memory for a long period (six or twelve months) for batch processing.

Assume that during a given 5-minute period the receiver 100 acquires a CPU utilization rate of 40% (=0.4) and the basis resource utilization rate store 120 maintains an average value of CPU utilization rates that were actually measured over a period of six or twelve months or obtained by a statistical estimation. If the server of the management division is exclusively used for the processing of a special routine such as to maintain personal records of the employees of each user division, the average value of the CPU utilization rates over a one-year period can be treated as constant if the performance of the server and the number of users remain unchanged. If there is a change in the number of user divisions and in the number of employees of each user division, care should be taken to determine the average value. If the average CPU utilization rate is 0.15, the difference value of the utilization rate is equal to 0,25. If the math function $f(x)=2000*x$, the collective adjustment payment calculator 104 produces an output $f(0.25)=2000*0.25=500$ (Yen) as a collective surcharge. Therefore, all user divisions that used the server in the 5-minute period are required to pay a surcharge of 500 (Yen) in total to the management division. If the number of user divisions is 4, the collective surcharge is divided by 4 in the individual adjustment payment calculator 106, yielding an individual surcharge of 125 (Yen) for each user division. If the CPU utilization rates of the four user divisions are known in advance as 20%, 12%, 6% and 2%, their shares of the collective surcharge are 250, 150, 75 and 25 (Yen), respectively.

With the same average CPU utilization rate of 15% (=0.15), if the CPU utilization rate measured during another 5-minute period is 5% (=0.05), the difference utilization rate is 0.05−0.15=−0.10. The collective adjustment payment for the 5-minute period is f(−0.10)=2000*(−0.10)=−200, thus producing a collective discount of 200 (Yen), which is shared by the individual user division as described above.

From the definition of average, the sum of the differences between sampled CPU utilization rates and the average value of all the sampled data is zero. Let f(x) be denoted as a linear function such as f(x)=k*x, then the sum of f(x) for all the sampled data "x" is also zero. Let p(i) represent the CPU utilization rate of a given period "i", ρ(ave) the average of CPU utilization rates, and "n" the number of the utilization rates data. Then, Σρ(i)/n=ρ(ave) and the sum of f(x) is Σ{f(ρ(i)−ρ(ave))}=Σ(k*(ρ(i)−ρ(ave))=k*Σ{ρ(i)−ρ(ave)}=0.

It follows from the above discussion that if the one-year average value of CPU utilization rates is obtained from actually observed sample data or from an accurate estimation, the one-year total sum of the surcharges and the discount values is zero. As a result, for all the user divisions the total sum of their annual surcharges and discounts is zero. It can be considered that, over the period of a year, user divisions exchange their surcharges and discounts among themselves.

Therefore, if the resource utilization rate of a user division is greater than the reference resource utilization rate for a given unit time interval, the charge of the user division is increased; otherwise, the charge is decreased. If all user divisions take account of surcharges in using a shared resource, the present invention would have the effect of flattening the load on the resources. In addition, due to the zero-sum effect of the surcharges and discounts, the income of the management division can be kept constant.

Figure 2:
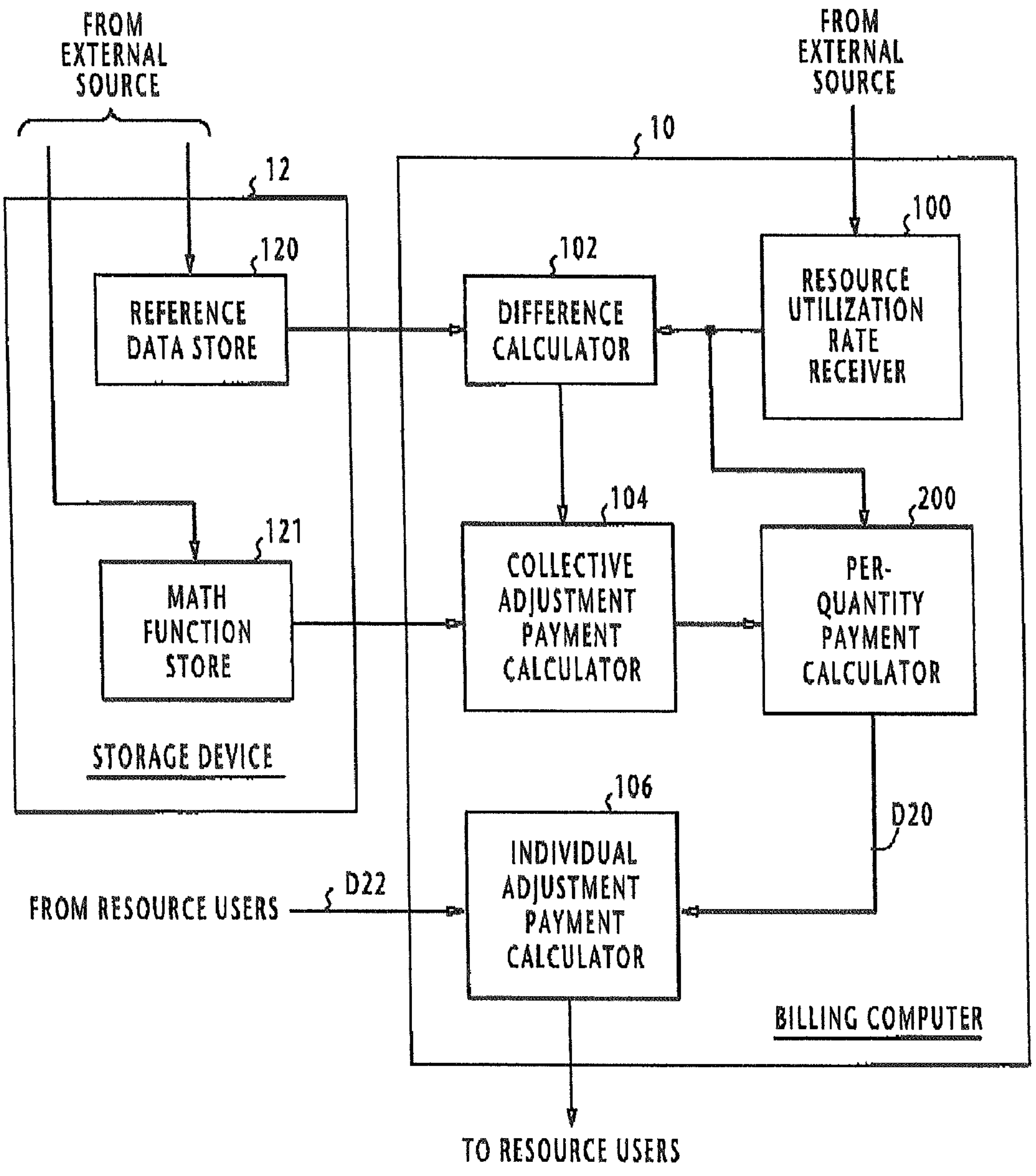
FIG. 2 is a block diagram of a billing system according to a modified embodiment of the present invention.

A modified embodiment of the present invention is shown in FIG. 2. This embodiment differs from the FIG. 1 embodiment in that a pert-quantity payment calculator 200 is additionally provided to receive the output of resource utilization rate receiver 100 and the output data D10 from the collective adjustment payment calculator 104. Output data D10 indicates the collective adjustment payment f(ρ(i)−ρ(ave)). Per-quantity payment calculator 200 divides this collective adjustment payment by the resource utilization rate ρ(i) to produce data D20 representing an adjustment payment per unit quantity (i.e., resource utilization rate and time) as follows:

$$f(\rho(i)-\rho(\mathrm{ave}))/\rho(i) \quad (1)$$

Assuming that the sampling interval is 5 minutes, the collective surcharge is 500 (Yen), and the CPU utilization rate is 40% (=0.40), the per-quantity surcharge is 500/0.40=1250 (Yen) per unit CPU utilization rate of 1.0 (=100%). The unit CPU utilization rate may be 0.01 (=1%,), in which case the per-quantity surcharge is 500/40=12.5 (Yen).

Instead of the output data D10 and D12 of FIG. 1, the individual adjustment payment calculator 106 receives the output data D20 of per-quantity payment calculator 200 and user data D22 from an external source. The data D22 represents the shares of CPU utilization rates of the individual users for each time interval. The calculator 106 multiplies D20 by D22 to produce individual surcharges or discounts of the respective users per each time interval. Therefore, the operation of the calculator 106 is reduced to a simple -arithmetic calculation.

In the previous embodiments, the basis resource utilization rate data is maintained in the storage device 12, which may be located away from the billing computer 10. In a further modification of the present invention shown in FIG. 3, the reference data is produced by a billing computer 30 and a storage device 32 which may be installed in the same housing with the billing computer 30 or may be a network attached storage. Storage device 32 has a resource utilization rate record store 320 and the math function store 122 of the previous embodiments. In the store 320, sampled resource utilization rate data are supplied from an external source and accumulated to create a past record of resource utilization rate. Billing computer 30 is similar to the billing computer 10 of the FIG. 1 embodiment except that the resource utilization rate receiver 100 is connected to the output of resource utilization rate record store 320 and an average calculator 300 is connected to the output of the receiver 100 to produce the reference (average) resource utilization rate.

Resource utilization rate receiver 100 acquires resource utilization rate data in sequence from the store 320 and provides the acquired data to the average calculator 300 as well as to the utilization rate difference calculator 102. Receiver 100 acquires CPU utilization rate data of a month or a six-month record at 5-minute intervals from the store 320. In one example, the receiver 100 reads data of a half-hour period of 13:00 to 13:30 (although in reality the data acquisition period may extend over a few months, half a year, etc.) at five-minute intervals from the acquired CPU utilization rate data, as follows:

| Data Sampling Time | CPU Utilization Rate |
|---|---|
| 13:05 | 0.07 |
| 13:10 | 0.13 |
| 13:15 | 0.45 |
| 13:20 | 0.22 |
| 13:25 | 0.08 |
| 13:30 | 0.13 |

Average calculator 300 calculates an average value of the acquired CPU utilization rates by summing them and dividing the sum by 6, yielding a result (0.07+0.13+0.45+0.22+0.08+0.13)/6=0.18.100.

Utilization rate difference calculator 102 produces the following CPU utilization rate differences:

| Data Sampling Time | CPU Utilization Rate Difference |
|---|---|
| 13:05 | 0.07 − 0.18 = −0.11 |
| 13:10 | 0.13 − 0.18 = −0.05 |
| 13:15 | 0.45 − 0.18 = 0.27 |
| 13:20 | 0.22 − 0.18 = 0.04 |
| 13:25 | 0.08 − 0.18 = −0.10 |
| 13:30 | 0.13 − 0.18 = −0.05 |

Note that the sum of the utilization rate difference values of the half-hour record is equal to zero. If data "f(x)=2000*x" is stored in the math function store 122, the collective adjustment payment calculator 104 produces the following results,

| Data Sampling Time | Collective Adjustment Payment |
|---|---|
| 13:05 | f (−0.11) = −220 |
| 13:10 | f (−0.05) = −100 |
| 13:15 | f (0.27) = 540 |
| 13:20 | f (0.04) = 80 |
| 13:25 | f (−0.10) = −200 |
| 13:30 | f (−0.05) = −100 |

Note that the sum of the surcharges and discount values of the half-hour record is also equal to zero.

Using the data obtained above, the individual adjustment payment calculator 106 calculates surcharges and discounts for individual user divisions. If the number of user divisions is 4 and a surcharge of 540 (Yen) is produced during a 5-minute interval in the equal-sharing policy, the surcharge is divided by 4, and the resultant surcharge of 135 (Yen) is given to each user division. If the shares of the CPU utilization rates of the four user divisions are 18%, 15%, 7% and 5% of the whole CPU utilization rate of 45% in the individual-sharing policy, the discounts are 216, 180, 84 and 60 (Yen), respectively.

Figure 3:
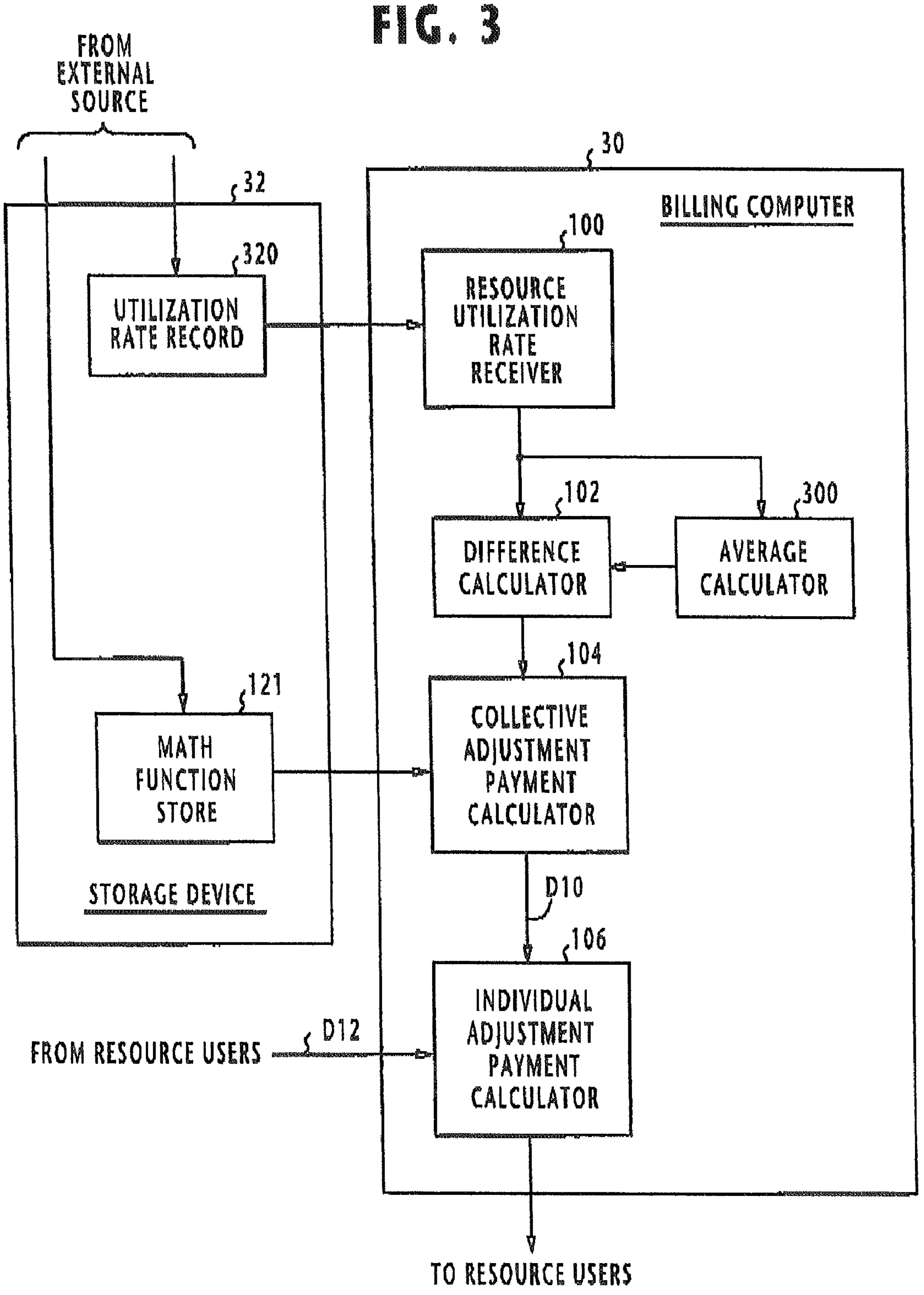
FIG. 3 is a block diagram of a billing system according to a further modification of the present invention.
Figure 4:
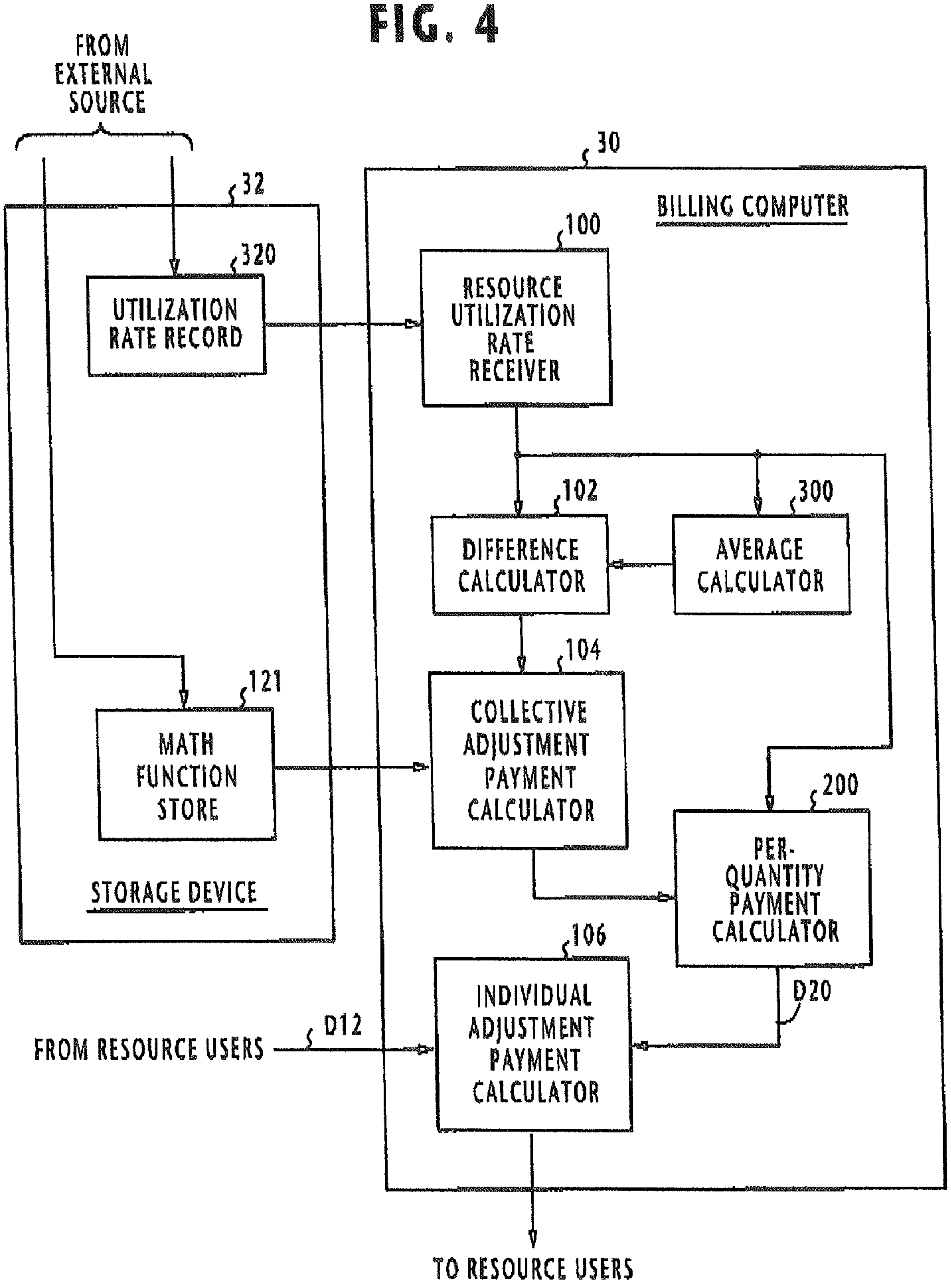
FIG. 4 is a block diagram of a billing system according to a modification of the embodiment of FIG. 3.

As illustrated in FIG. 4, the embodiment of FIG. 3 is modified by making the per-quantity payment calculator 200 of FIG. 2 receive the outputs of resource utilization rate receiver 100 and collective adjustment payment calculator 104. Per-quantity payment calculator 200 solves Equation (1) by dividing the output of calculator 104 by the output of receiver 100. If the unit utilization rate of Equation (1) is equal to 1.0, the per-quantity payment calculator 200 produces the following per-quantity adjustment payments:

| Sampling Time | Coll, Adjust. Payment | Per-Qty Adjust. Payment |
|---|---|---|
| 13:05 | −220 | −220 ÷ 0.07 = −3143 |
| 13:10 | −100 | −100 ÷ 0.13 ≈ −769 |
| 13:15 | 540 | 540 ÷ 0.45 = 1200 |
| 13:20 | 80 | 80 ÷ 0.22 ≈ 364 |
| 13:25 | −200 | −200 ÷ 0.08 = −2500 |
| 13:30 | −100 | −100 ÷ 0.13 ≈ −769 |

If the unit utilization rate is equal to 0.01, the per-quantity payment calculator 200 produces the following per-quantity adjustment payments:

| Sampling Time | Coll, Adjust. Payment | Per-Qty Adjust. Payment |
|---|---|---|
| 13:05 | −220 | −220 ÷ 7 = −31.43 |
| 13:10 | −100 | −100 ÷ 13 ≈ −7.69 |
| 13:15 | 540 | 540 ÷ 45 = 12.00 |
| 13:20 | 80 | 80 ÷ 22 ≈ 3.64 |
| 13:25 | −200 | −200 ÷ 8 = −25.00 |
| 13:30 | −100 | −100 ÷ 13 ≈ −7.69 |

Figure 5:
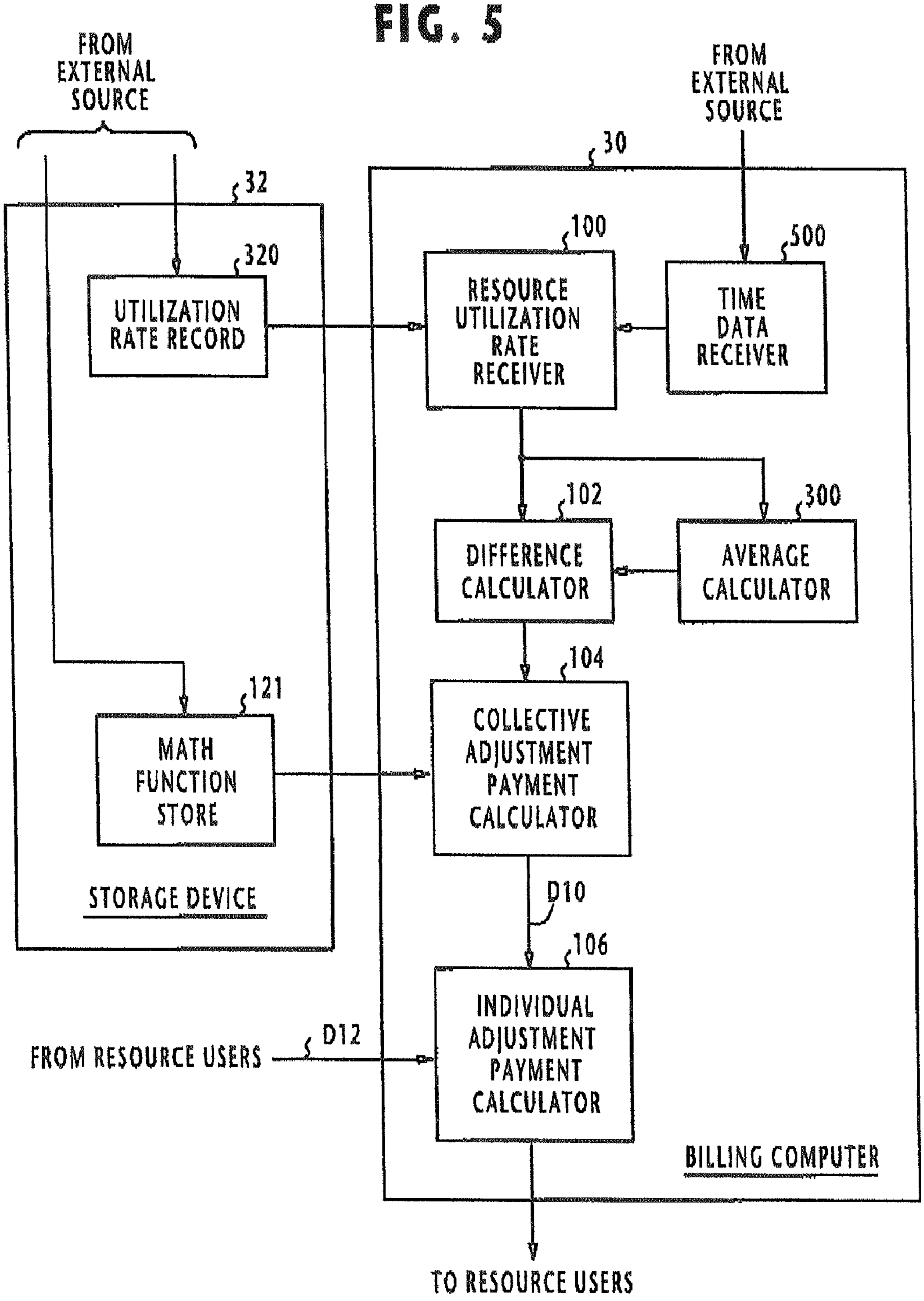
FIG. 5 is a block diagram of a billing system according to a further modification of the embodiment of FIG. 3.

As illustrated in FIG. 5, the embodiment of FIG. 3 is further modified by providing a time data receiver 500, which receives time data and supplies the received time data to the resource utilization rate receiver 100. The time data indicates a monthly-defined period of a year and an hourly-defined period of each day within the specified months of the year. According to the time data the resource utilization rate receiver 100 acquires resource utilization rate data of the specified hours of the days of the specified months from the store 320. The server's manager may further specify a period of 9:00 to 17:00 (users' working hours) of the specified period of Apr. 1 to Jun. 30 of the year 2005, for example.

What is claimed is:

1. A billing system comprising, a data acquisition section that acquires data representing a resource utilization rate;

a first calculation section that calculates a utilization rate difference between the acquired resource utilization rate and a reference resource utilization rate; and a second calculation section that substitutes said utilization rate difference for the argument of a predetermined math function to produce an adjustment payment.

2. The billing system of claim 1, further comprising a third calculation section that arithmetically divides said adjustment payment by said acquired resource utilization rate to produce a per-quantity adjustment payment.

3. The billing system of claim 1, wherein said reference resource utilization rate is an average value of resource utilization rates.

4. The billing system of claim 2, wherein said reference resource utilization rate is an average value of resource utilization rates.

5. The billing system of claim 1, wherein said resource utilization rate is a CPU utilization rate.

6. The billing system of claim 1, wherein said math function is a linear function.

7. The billing system of claim 1, wherein said adjustment payment is a collective adjustment payment, further comprising a fourth calculation section that calculates individual adjustment payments from said collective adjustment payment.

8. The billing system of claim 7, wherein said fourth calculation section divides said collective adjustment payment by the number of resource users.

9. The billing system of claim 7, wherein said fourth calculation section proportions said collective adjustment payment according to percentages of resources respectively consumed by resource users so that said individual adjustment payments are of different values proportional to said percentages.

10. A billing system comprising;

a resource utilization rate data acquisition section that acquires a record of data representing resource utilization rates obtained over a period of time;

a first calculation section that calculates an average value of resource utilization rates of said acquired record to produce a reference resource utilization rate;

a second calculation section that calculates a utilization rate difference between each of said acquired resource utilization rates and said reference resource utilization rate; and a third calculation section that substitutes said utilization rate difference for the argument of a predetermined math function to produce an adjustment payment.

11. The billing system of claim 10, further comprising a fourth calculation section that arithmetically divides said adjustment payment by each of said acquired resource utilization rates to a per-quantity adjustment payment.

12. The billing system of claim 10, further comprising a storage device that maintains said record of data, wherein said data acquisition section acquires said record of data from said storage device.

13. The billing system of claim 11, further comprising a storage device that maintains said record of data, wherein said data acquisition section acquires said record of data from said storage device.

14. The billing system of claim 10, further comprising a time data acquisition section that acquires time data representing a monthly-defined period of a year and an hourly-defined period of a day, wherein said resource utilization rate acquisition section acquires said data from said storage device according to said time data.

15. The billing system of claim 11, further comprising a time data acquisition section that acquires time data representing a monthly-defined period of a year and an hourly-defined period of a day, wherein said resource utilization rate acquisition section acquires said data from said storage device according to said time data.

16. The billing system of claim 10, wherein said plurality of resource utilization rates are CPU utilization rates.

17. The billing system of claim 10, wherein said math function is a linear function.

18. The billing system of claim 10, wherein said adjustment payment is a collective adjustment payment, further comprising a fourth calculation section that calculates individual adjustment payments from said collective adjustment payment.

19. The billing system of claim 18, wherein said fourth calculation section divides said collective adjustment payment by the number of said users.

20. The billing system of claim 18, wherein said fourth calculation section proportions said collective adjustment payment according to percentages of resources respectively consumed by resource users so that said individual adjustment payments are of different values proportional to said respective percentages.

21. A method of billing comprising:

maintaining a reference resource utilization rate and a predetermined math function to produce an adjustment payment in a storage device;

acquiring data representing a resource utilization rate;

calculating, by a billing computer, a utilization rate difference between the acquired resource utilization rate and a reference resource utilization rate read from said storage device; and substituting, by said billing computer, said utilization rate difference for the argument of said predetermined math function read from said storage device to produce an adjustment payment.

22. The method of claim 21, further comprising arithmetically dividing said adjustment payment by said acquired resource utilization rate to produce a per-quantity adjustment payment.

23. The method of claim 21, wherein said reference resource utilization rate is an average value of resource utilization rates of said acquired data.

24. The method of claim 22, wherein said reference resource utilization rate is an average value of resource utilization rates of said acquired data.

25. The method of claim 21, wherein said resource utilization rate is a CPU utilization rate.

26. The method of claim 21, wherein said math function is a linear function.

27. The method of claim 21, wherein said adjustment payment is a collective adjustment payment, further comprising calculating individual adjustment payments from said collective adjustment payment.

28. The method of claim 27, wherein the calculating said individual adjustment payments comprises dividing said collective adjustment payment by the number of resource users.

29. The method of claim 27, wherein the calculating said individual adjustment payments comprises proportioning said collective adjustment payment according to respective percentages of resources consumed respectively by resource users so that said individual adjustment payments are of different values proportional to said respective percentages.

30. A method of billing comprising the steps of;

maintaining a record of data representing a plurality of recourse utilization rates obtained at predetermined intervals over time and a predetermined math function to produce an adjustment payment in a storage device;

a) acquiring said record of data from said storage device;

b) calculating, by a billing computer, an average value of said acquired resource utilization rates to produce a reference resource utilization rate;

c) calculating, by said billing computer, utilization rate differences between said acquired resource utilization rates and said reference resource utilization rate; and d) substituting, by said billing computer, each of said utilization rate differences for the argument of said predetermined math function read from said storage device to produce an adjustment payment.

31. The method of claim 30, further comprising arithmetically dividing each of said adjustment payments by each of said acquired resource utilization rates to produce per-quantity adjustment payments.

32. The method of claim 31, further comprising acquiring time data representing a monthly-defined period of a year and an hourly-defined period of a day, wherein said step (a) acquires said data from said storage device according to said time data.

33. The method of claim 30, further comprising acquiring time data representing a monthly-defined period of a year and an hourly-defined period of a day, wherein said step (a) acquires said data from said storage device according to said time data.

34. The method of claim 30, wherein said resource utilization rate are CPU utilization rates.

35. The method of claim 30, wherein said adjustment payment is a collective adjustment payment, further comprising calculating individual adjustment payments from said collective adjustment payment.

36. The method of claim 35, wherein the calculating said individual adjustment payments comprises dividing said collective adjustment payment by the number of resource users.

37. The method of claim 35, wherein the calculating said individual adjustment payments comprises proportioning said collective adjustment payment according to percentages of resources respectively consumed by resource users so that said individual adjustment payments are of different values proportional to said percentages.

38. A computer-readable storage medium that stores a billing program comprising the instructions of: acquiring data representing a resource utilization rate; calculating a utilization rate difference between the acquired resource utilization rate and a reference resource utilization rate; and substituting said utilization rate difference for the argument of a predetermined math function to produce an adjustment payment.

39. A computer-readable storage medium that stores a billing program comprising the instructions of: a) acquiring a record of data representing resource utilization rates obtained over a period of time; b) calculating an average value of resource utilization rates of said acquired data to produce a reference resource utilization rate; c) calculating a utilization rate difference between each of said acquired resource utilization rates and said reference resource utilization rate; and d) substituting the utilization rate difference for the argument of a predetermined math function to produce an adjustment payment.

* * * * *

UNITED STATES PATENT AND TRADEMARK OFFICE
CERTIFICATE OF CORRECTION

PATENT NO. : 7,853,631 B2
APPLICATION NO. : 11/612815
DATED : December 14, 2010
INVENTOR(S) : Yasuhiro Ajiro It is certified that error appears in the above-identified patent and that said Letters Patent is hereby corrected as shown below:

Column 1, Line 58: delete “maintain” and insert -- maintain, --

Column 3, Line 29: delete “function” and insert -- function, --

Column 3, Line 58: delete “110” and insert -- D10 --

Column 4, Line 25: delete “his” and insert -- this --

Column 5, Line 53: delete “(=1%,),” and insert -- (=1%), --

Column 5, Line 63: delete “-arithmetic” and insert -- arithmetic --

Column 6, Line 40: delete “0.18.100.” and insert -- 0.18. --

Column 6, Line 56: delete “results,” and insert -- results: --

Signed and Sealed this
Sixteenth Day of October, 2012

David J. Kappos
*Director of the United States Patent and Trademark Office*